(12) United States Patent
Siciliano et al.

(10) Patent No.: US 9,350,199 B2
(45) Date of Patent: May 24, 2016

(54) TRANSFER SWITCH WITH BYPASS TOPOLOGY

(71) Applicant: ASCO Power Technologies L.P., Florham Park, NJ (US)

(72) Inventors: Robert Siciliano, Boonton, NJ (US); Daniel Scheffer, Boonton, NJ (US)

(73) Assignee: ASCO Power Technologies L.P., Florham Park, NJ (US)

( * ) Notice: Subject to any disclaimer, the term of this patent is extended or adjusted under 35 U.S.C. 154(b) by 263 days.

(21) Appl. No.: 14/061,810

(22) Filed: Oct. 24, 2013

(65) Prior Publication Data

US 2015/0115719 A1    Apr. 30, 2015

(51) Int. Cl.
| | |
|---|---|
| *H02J 7/00* | (2006.01) |
| *H02J 9/00* | (2006.01) |
| *H02J 9/06* | (2006.01) |
| *H02J 4/00* | (2006.01) |
| *H02J 3/00* | (2006.01) |

(52) U.S. Cl.
CPC ... *H02J 9/06* (2013.01); *H02J 3/00* (2013.01); *H02J 4/00* (2013.01); *Y10T 307/615* (2015.04)

(58) Field of Classification Search
CPC .............. H02J 3/00; H02J 3/38; H02J 3/005; H02J 4/00; H02J 9/00; H02J 9/06; H02J 2009/068; Y10T 307/615

USPC ........................................................... 307/64
See application file for complete search history.

(56) References Cited

U.S. PATENT DOCUMENTS

2010/0140061 A1*  6/2010  Gibbs ..................... H02J 9/06
                                                          200/50.32

* cited by examiner

*Primary Examiner* — Carlos Amaya
(74) *Attorney, Agent, or Firm* — McDonnell Boehnen Hulbert & Berghoff LLP

(57) ABSTRACT

An automatic transfer switch (ATS) for supplying power to a load is provided. The ATS includes a main transfer switch portion configured to connect one of a first or second power source to the load. The ATS also includes a bypass transfer switch portion configured to form a bypass connection from either the first or second power source to the load. The bypass transfer switch portion includes (i) a first bypass switch configured to connect the first power source to the load upon closing of the first bypass switch and (ii) a second bypass switch configured to connect the second power source to the load upon closing of the second bypass switch. Further, the ATS includes a primary load connection connecting the main transfer switch portion to the load, where the primary load connection is formed at least in part by the first and second bypass switches.

20 Claims, 7 Drawing Sheets

TRANSFER SWITCH WITH BYPASS TOPOLOGY

BACKGROUND

Unless otherwise indicated herein, the materials described in this section are not prior art to the claims in this application and are not admitted to be prior art by inclusion in this section.

An automatic transfer switch (ATS) is designed to provide a continuous source of power for critical loads by automatically transferring from a normal power source to an emergency power source when one or more predetermined events occur (e.g., the normal power source falls below a preset limit). Automatic transfer switches are in widespread use in, for example, airports, subways, schools, hospitals, military installations, industrial sites, and commercial buildings equipped with secondary power sources and where even brief power interruptions can be costly (or perhaps even life threatening). Transfer switches operate, for example, to transfer a power consuming load from a circuit with a normal power supply to a circuit with an auxiliary power supply. For instance, a transfer switch can control electrical connection of utility power lines and the diesel generator to facility load buses. In certain installations, the transfer switch automatically starts a standby generator and connects the standby generator to the load bus upon loss of utility power. In addition, the transfer switch can automatically reconnect the utility power to the load bus if utility power is reestablished.

In an example, a transfer switch may include a main transfer switch and a bypass feature. The bypass feature typically includes a secondary electro-mechanical switching device (bypass switch) that can route power to the load in a fashion which circumvents the main transfer switch. This bypass feature allows, for example, (i) switch redundancy if a problem arises with the main transfer switch, (ii) exercising the main transfer switch without a load connection, and (iii) isolation for maintenance of the main transfer switch while ensuring the continuity of power to the load or loads.

SUMMARY

In one example aspect, an ATS configured for supplying power to an electrical load is provided. The ATS includes a main transfer switch portion configured to connect either a first power source or a second power source to the load. The main transfer switch portion includes (i) a first main switch configured to connect the first power source to the load upon closing of the first main switch and (ii) a second main switch configured to connect the second power source to the load upon closing of the second main switch. The ATS further includes a bypass transfer switch portion configured to form a bypass connection from either the first power source or the second power source to the load. The bypass transfer switch portion includes (i) a first bypass switch configured to connect the first power source to the load upon closing of the first bypass switch and (ii) a second bypass switch configured to connect the second power source to the load upon closing of the second bypass switch. The ATS still further includes a primary load connection connecting the main transfer switch portion to the load, wherein the primary load connection is formed at least in part by the first bypass switch or the second bypass switch, and wherein closing of either the first bypass switch or the second bypass switch severs the primary load connection between the main transfer switch portion and the load.

In another example, the ATS includes a main transfer switch portion configured to connect either a first power source or a second power source to the load. The main transfer switch portion includes (i) a first main switch configured to connect the first power source to the load upon closing of the first main switch and (ii) a second main switch configured to connect the second power source to the load upon closing of the second main switch. The ATS further includes a bypass transfer switch portion configured to form a bypass connection from either the first power source or the second power source to the load. The bypass transfer switch portion includes (i) a first bypass switch configured to connect the first power source to the load upon closing of the first bypass switch and (ii) a second bypass switch configured to connect the second power source to the load upon closing of the second bypass switch. The ATS still further includes a primary load connection connecting the main transfer switch portion to the load, wherein the primary load connection is formed at least in part by the first bypass switch or the second bypass switch, and wherein closing of either the first bypass switch or the second bypass switch severs the primary load connection between the main transfer switch portion and the load. Still further, the ATS is configured such that the main transfer switch portion no longer provides power to the load when the bypass switch portion is activated to form a bypass connection from either the first power source or the second power source to the load.

In another example, a method is provided for electrically isolating the main transfer switch portion from the bypass transfer switch portion without physically separating the main transfer switch portion from the bypass transfer switch portion. The method may, for example, be performed by an ATS in accordance with the present disclosure. The ATS may include (i) a main transfer switch portion configured to connect one of a first power source or a second power source to the load (ii) a bypass transfer switch portion configured to form a bypass connection from either the first power source or the second power source to the load, and (iii) a primary load connection connecting the main transfer switch portion to the load via the bypass transfer switch portion. In an example embodiment, the method involves the bypass switch activating to form the bypass connection from either the first power source or the second power source to the load, wherein activating to form the bypass connection severs the primary load connection connecting the main transfer switch portion to the load via the bypass transfer switch portion, and wherein severing the primary load connection isolates the main transfer switch portion from the load.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
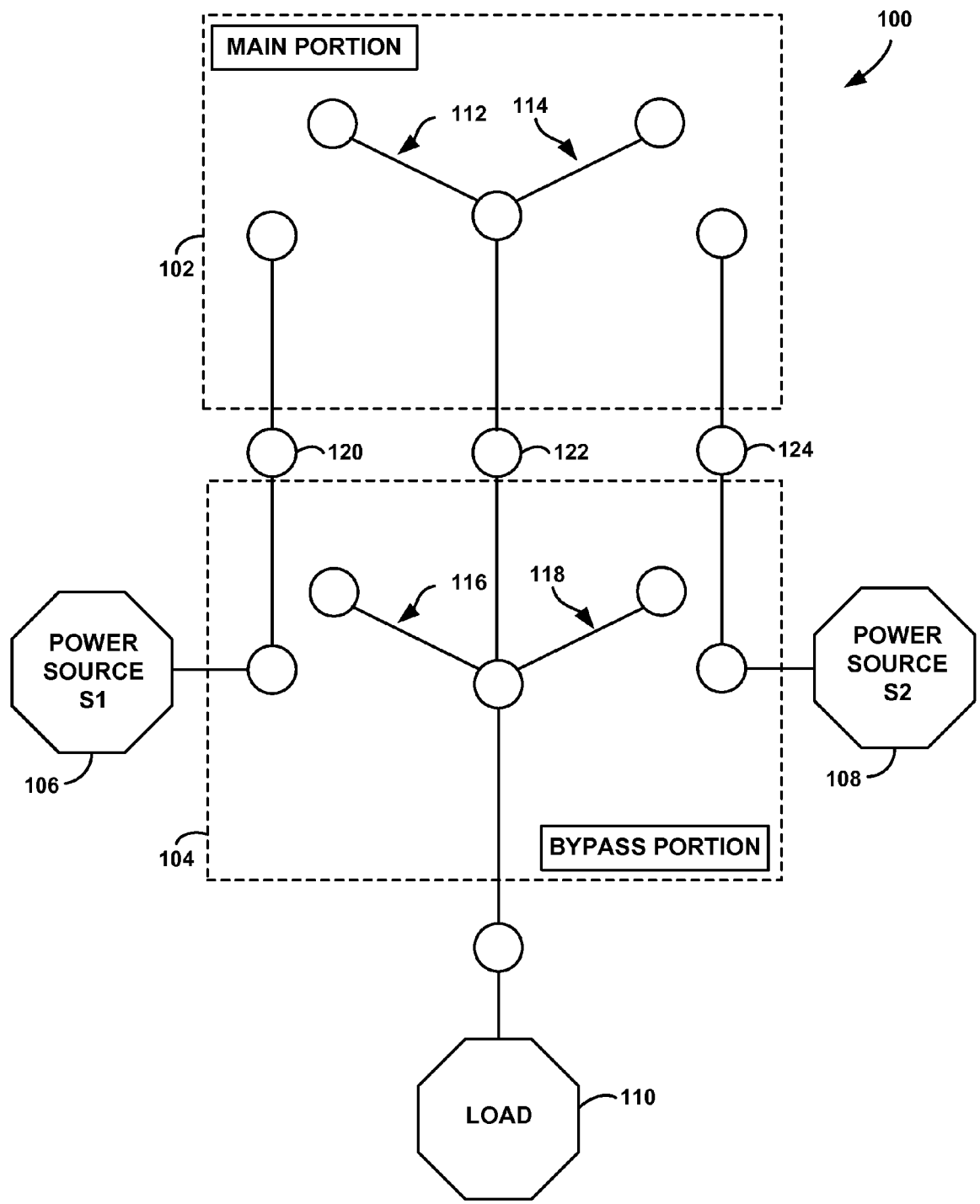
FIG. 1 is a schematic drawing of an example ATS with bypass.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein. As just one example, Applicants' figures comprise one line diagrams, but those of ordinary skill in the art will recognize that such figures are merely illustrative and that these figures may comprise other configurations such as representing poles to switch one, two, or three phases of power (lines) and also a neutral switching pole.

1. OVERVIEW

A typical arrangement for an ATS having a bypass portion is depicted in FIG. 1. In particular, FIG. 1 depicts an ATS 100 having a main transfer switch portion 102 and a bypass transfer switch portion 104. The main transfer switch portion 102 is configured to connect either a first power source 106 or a second power source 108 to a load 110. The main transfer switch portion 102 includes a first main switch 112 configured to connect the first power source 106 to the load 110 upon closing of the first main switch 112. The main transfer switch portion 102 further includes a second main switch 114 configured to connect the second power source 108 to the load 110 upon closing of the second main switch 114. The main portion 102 illustrated in FIG. 1, as well in any main portion described herein, may comprise two switching mechanisms as herein described, but could also be one switching mechanism that is arranged to be closed on either S1 or S2, such as a true double throw configuration with no intentional open position. Alternatively, such switching mechanism could also comprise a true double throw switch with an open position.

The bypass transfer switch portion 104 is configured to form a bypass connection from either the first power source 106 or the second power source 108 to the load 110. The bypass transfer switch portion 104 includes a first bypass switch 116 configured to connect the first power source 106 to the load 110 upon closing of the first bypass switch 116. The bypass transfer switch portion 104 further includes a second bypass switch 118 configured to connect the second power source 108 to the load 110 upon closing of the second bypass switch 118.

ATS 100 also includes three isolation contacts 120, 122, and 124, such as self aligning jaws that allow for consistent alignment with bus stabs. As such, ATS 100 depicted in FIG. 1 can be described as two transfer switches arranged in a series-parallel arrangement, with three isolation contact points between the two transfer switches. Isolation contact 120 may serve to isolate the main transfer switch portion 102 from the first power source 106. Further, isolation contact 122 may serve to isolate the main transfer switch portion 102 from load 110. Still further, isolation contact 124 may serve to isolate the main transfer switch portion 102 from second power source 108.

As typically constructed, the isolation contacts 120, 122, and 124 (such as the self-aligning jaws described above) are not capable of interrupting current, as they have no arc extinction capability. Therefore, a proper sequence to isolate the transfer switch 100 is to operate the bypass portion 104 so that it is in parallel with the main portion 102. For example, both the main and bypass portion switches 112, 116, respectively, can be closed on the first power source S1 106. Then the main portion 102 can be drawn out of the switch 100 and the isolation contacts 120, 122, and 124 can then be separated. This sequence of operation results in insignificant voltage appearing across the isolation contacts (because they are bypassed) and prevents any arcing during the isolation operation. If the main portion 102 is open from both sources S1 and S2, the isolation contacts 120, 122, 124 can be separated (i.e., the switch may be drawn out) because no current is flowing through any of the isolation contacts.

This typical ATS arrangement shown in FIG. 1 suffers from certain perceived limitations and disadvantages. Due to the nature of their mechanical design, coordination of the main transfer switch position is needed when activating and deactivating the bypass and isolation features. This coordination is typically facilitated by mechanical and/or electrical interlock mechanisms that are provided to prevent unintentionally inducing a short-circuit between the power sources across the two switching mechanisms. For example, this arrangement depicted in FIG. 1 requires interlocking between main transfer switch portion 102 and bypass transfer switch portion 104 (e.g., mechanical and/or electrical interlocks) to ensure that a short-circuit between the two power sources S1 and S2 cannot be created via a combination of the positions of main transfer switch portion 102 and positions of bypass transfer switch portion 104. Such interlocking between the main transfer switch portion 102 and the bypass transfer switch portion 104 can add to the complexity of the ATS as well as the cost of the ATS (e.g., the cost of manufacturing the ATS and/or servicing the ATS).

Likewise, similar coordination and protection is needed when electrically isolating and reconnecting the main transfer switch portion 102 to and from the bypass transfer switch portion 104. These coordination and protection functions are inherently provided by design but, depending upon the implementation, can add complexity to the product and its usage. The arrangement depicted in FIG. 1 requires a distinct step to mechanically or electrically isolate the main transfer switch portion 102 from the bypass transfer switch portion 104. This distinct isolation step is typically achieved by physically separating (i.e., manually or automatically) the two portions at the isolation contact points. This isolation step may be both difficult and time consuming, thereby adding to the difficulty of servicing the ATS and/or the time required to service the ATS.

Since bypass operations may be conducted during a time of operator duress (e.g., such as during a power outage), it is desirable to make the operating method as easy and as intuitive as possible. Thus, a means is needed to simplify the operating process, reduce complexity, but still maximize safety to remove the potential for unintended consequences such as short-circuits.

These example problems associated with existing ATSs such as ATS 100 can be addressed by the new topology disclosed in the present application. An example ATS in accordance with the present disclosure may include a main transfer switch portion configured to connect either a first power source or a second power source to the load. The main transfer switch portion may include (i) a first main switch configured to connect the first power source to the load upon closing of the first main switch and (ii) a second main switch configured to connect the second power source to the load upon closing of the second main switch. The ATS may also include a bypass transfer switch portion configured to form a bypass connection from either the first power source or the second power source to the load. This bypass transfer switch portion may include (i) a first bypass switch configured to connect the first power source to the load upon closing of the first bypass switch and (ii) a second bypass switch configured to connect the second power source to the load upon closing of the second bypass switch. The ATS may also include a primary load connection connecting the main transfer switch portion to the load, wherein the primary load connection is formed at least in part by the first bypass switch and the second bypass switch, and wherein closing of either the first bypass switch or the second bypass switch severs the primary load connection between the main transfer switch portion and the load. The ATS may be further configured such that the main transfer switch portion is electrically isolated from the load, first power source, and second power source when the bypass switch portion is activated to form a bypass connection from one of the first power source or the second power source to the load.

Beneficially, this disclosed topology has the mechanisms arranged in a way that removes the need for an interlock mechanism between the main transfer switch portion and the bypass transfer switch portion. Further, the disclosed topology also beneficially removes the need for a distinct load isolation step, typically referred to in the art as a rack-out step. Still further, the disclosed topology beneficially removes the potential for introduction of a short-circuit when activating or deactivating the bypass mechanism.

2. EXAMPLE ATS SYSTEMS AND METHODS

Figure 2:
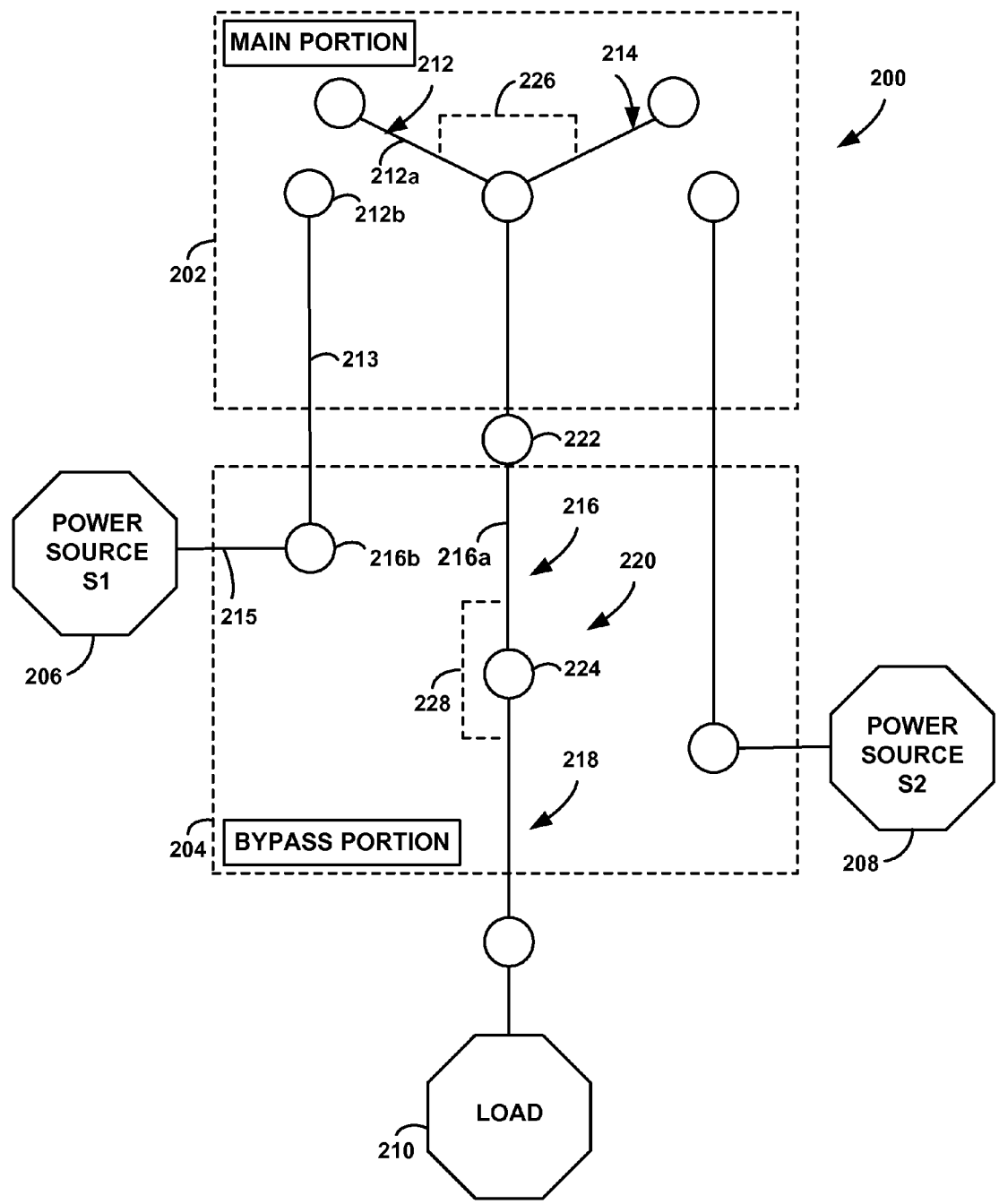
FIG. 2 is a schematic drawing of an example ATS, according to an example embodiment of the present disclosure.

FIG. 2 is an illustration of an example ATS in accordance with an embodiment of the present disclosure. In particular, FIG. 2 depicts an ATS 200 having a main transfer switch portion 202 and a bypass transfer switch portion 204. The main transfer switch portion 202 is configured to connect either a first power source 206 or a second power source 208 to a load 210. The first power source may, for example, be a normal source of electrical power for the load 210, while the second power source 208 may be an emergency source of power for the load 210. The ATS 200 may be operable to transfer electrical load 210 from the normal source of electrical power to the emergency source of electrical power upon the occurrence of one or more predetermined events.

The main transfer switch portion 202 includes a first main switch 212 configured to connect the first power source 206 to the load 210 upon closing of the first main switch 212. The main transfer switch portion 202 further includes a second main switch 214 configured to connect the second power source 208 to the load 210 upon closing of the second main switch 214. First main switch 212 and second main switch 214 may each include a stationary contact and a movable contact. For example, first main switch 212 includes movable contact 212a and stationary contact 212b. When first main switch 212 is closed, movable contact 212a and stationary contact 212b are connected to one another. These stationary contacts may be connected to a conductor (e.g., a rigid conductor) that communicates with one of power source 206 or power source 208. For example, as shown in FIG. 2, stationary contact 212b is connected to power source 206 via conductors 213 and 215.

It may be necessary in some circumstances to perform maintenance work on the main transfer switch portion 202 or even to replace it in part or in its entirety. Therefore, bypass transfer switch portion 204 may be employed to provide continuity of power to the load 210 while the main transfer switch portion 202 is out of service. As such, the bypass transfer switch portion 204 is configured to form a bypass connection from one of the first power source 206 or the second power source 208 to the load 210. The bypass connection circumvents the main transfer switch portion 202 upon activation of the bypass transfer switch portion 204, in order to supply power to the load 210. The bypass transfer switch portion 204 includes a first bypass switch 216 configured to connect the first power source 206 to the load 210 upon closing of the first bypass switch 216. The bypass transfer switch portion 204 further includes a second bypass switch 218 configured to connect the second power source 208 to the load 210 upon closing of the second bypass switch 218.

ATS 200 also includes a primary load connection 220 connecting the main transfer switch portion 202 to the load 210. As shown in FIG. 2, the primary load connection 220 is formed at least in part by the first bypass switch 216 and the second bypass switch 218 (in particular, when the first bypass switch 216 and the second bypass switch 218 are both in the open position). Closing of either the first bypass switch 216 or the second bypass 218 switch severs the primary load connection 220 between the main transfer switch portion 202 and the load 210. As mentioned above, the primary load connection 220 is formed at least in part by the first bypass switch 216 and the second bypass switch 218. In an example, the switches 216, 218 form the entire primary load connection 220 between isolation contact point 222 and load 210. However, in another example, the switches 216, 218 form part of the primary load connection 220 between isolation contact point 222 and load 210. For example, the switches 216 and 218 may be separated by a conductor line (e.g., a rigid connector) connecting switch 216 to switch 218. That is, switches 216 and 218 may not be adjacent to one another as shown in FIG. 2, but may instead be separated by a conductor.

The primary load connection 220 further includes a first load-isolation contact 222 and a second load-isolation contact 224. The first bypass switch 216 connects to the first load-isolation contact 222 when 216 a is closed to contact 222, as shown in FIG. 2. Further, the second bypass switch 218 connects to the second load-isolation contact 224 when switch 218 is closed to the load 210, as shown in FIG. 2. It should be understood that the schematic drawing of ATS 200 shows one example configuration of how bypass switch 216 and bypass switch 218 (including load-isolation contact 222 and load isolation contact 224) may together form primary load connection 220. However, it should be understood that this is merely one example orientation, and the primary load connection in accordance with the present disclosure may be formed in other ways.

First bypass switch 216 and second bypass switch 218 may include a stationary contact, movable contact, and the load-isolation contact. For example, first bypass switch 216 includes movable contact 216a, stationary contact 216b, and load-isolation contact 222. When first bypass switch 216 is closed, movable contact 216a and stationary contact 216b are connected to one another. These stationary contacts may be connected to a conductor (e.g., a rigid conductor) that communicates with one of power source 206 or power source 208. For example, as shown in FIG. 2, stationary contact 216b is connected to power source 206 via conductor 215.

Figure 3:
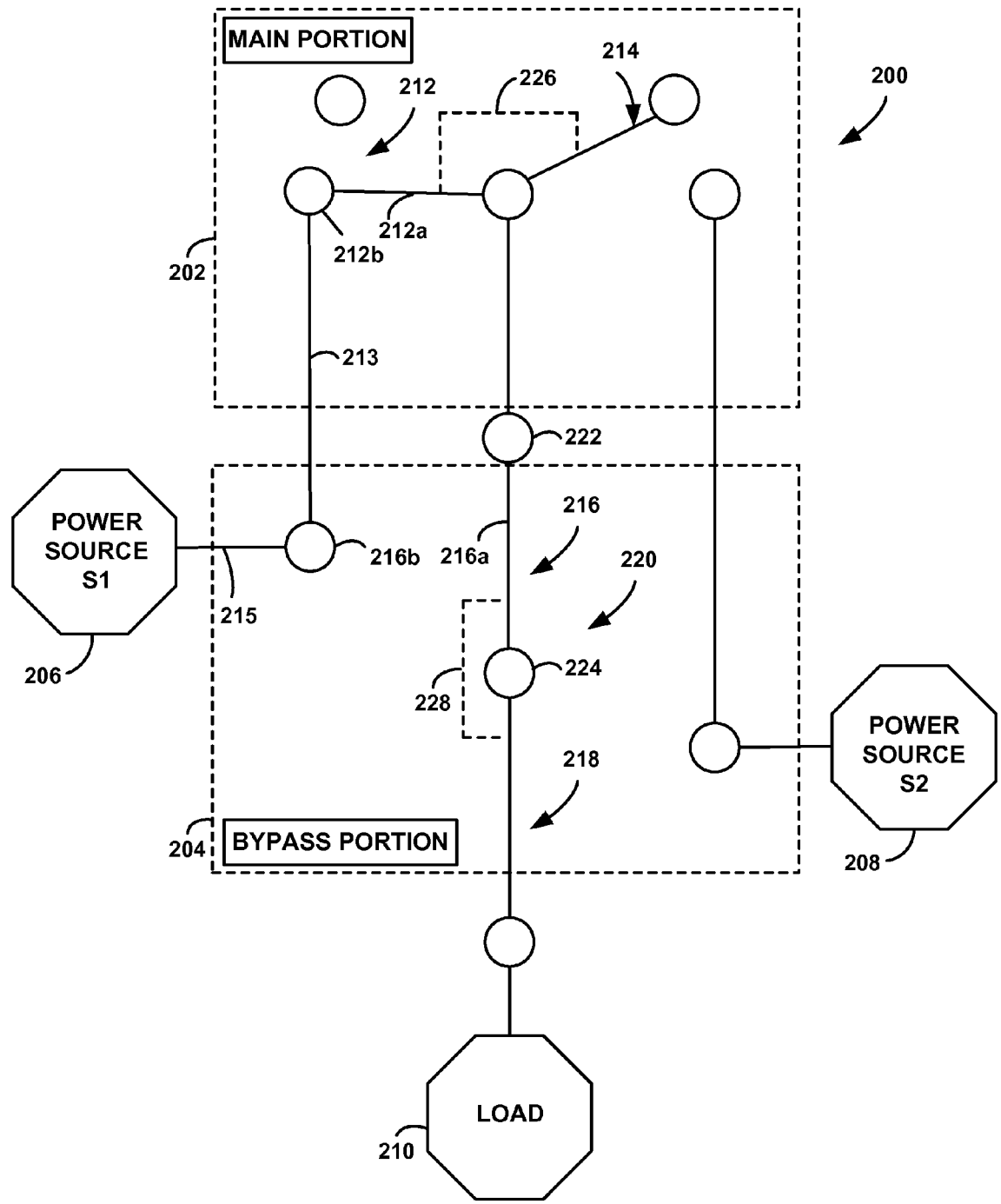
FIG. 3 is a schematic drawing of the example ATS of FIG. 2, where the first main switch is connected to the first power source.
Figure 4:
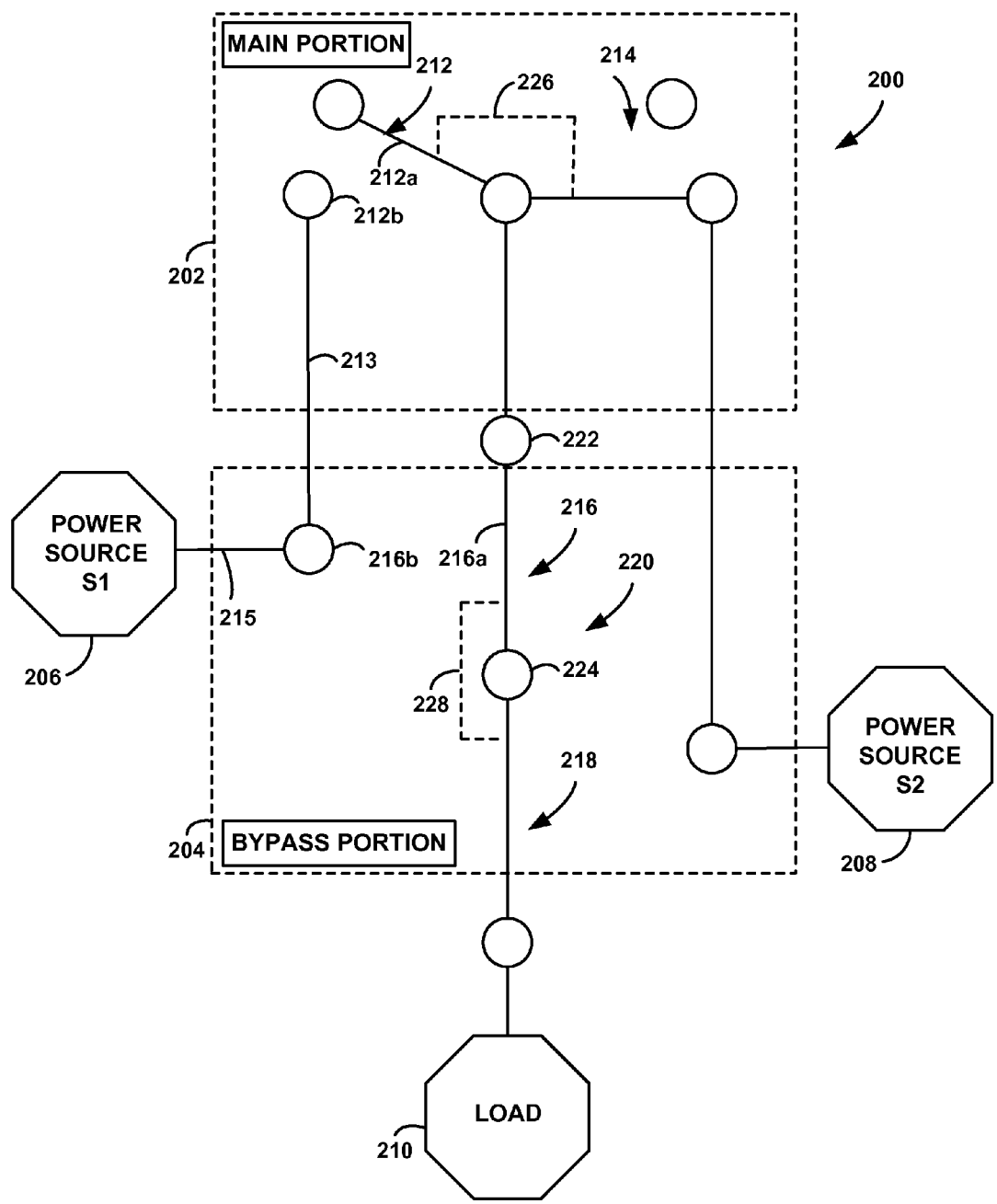
FIG. 4 is a schematic drawing of the example ATS of FIG. 2, where the second main switch is connected to the second power source.
Figure 5:
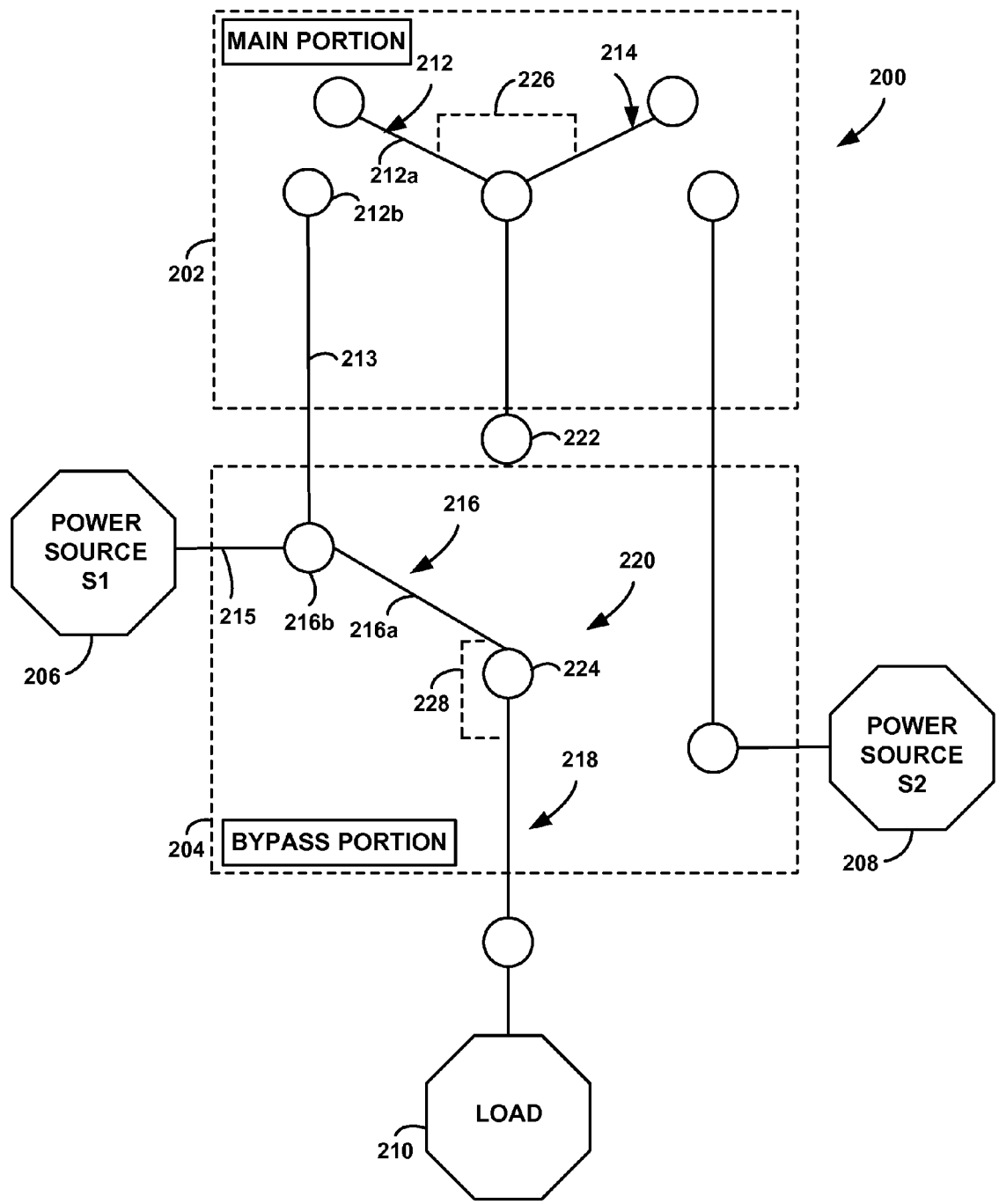
FIG. 5 is a schematic drawing of the example ATS of FIG. 2, where the first bypass switch is connected to the first power source.
Figure 6:
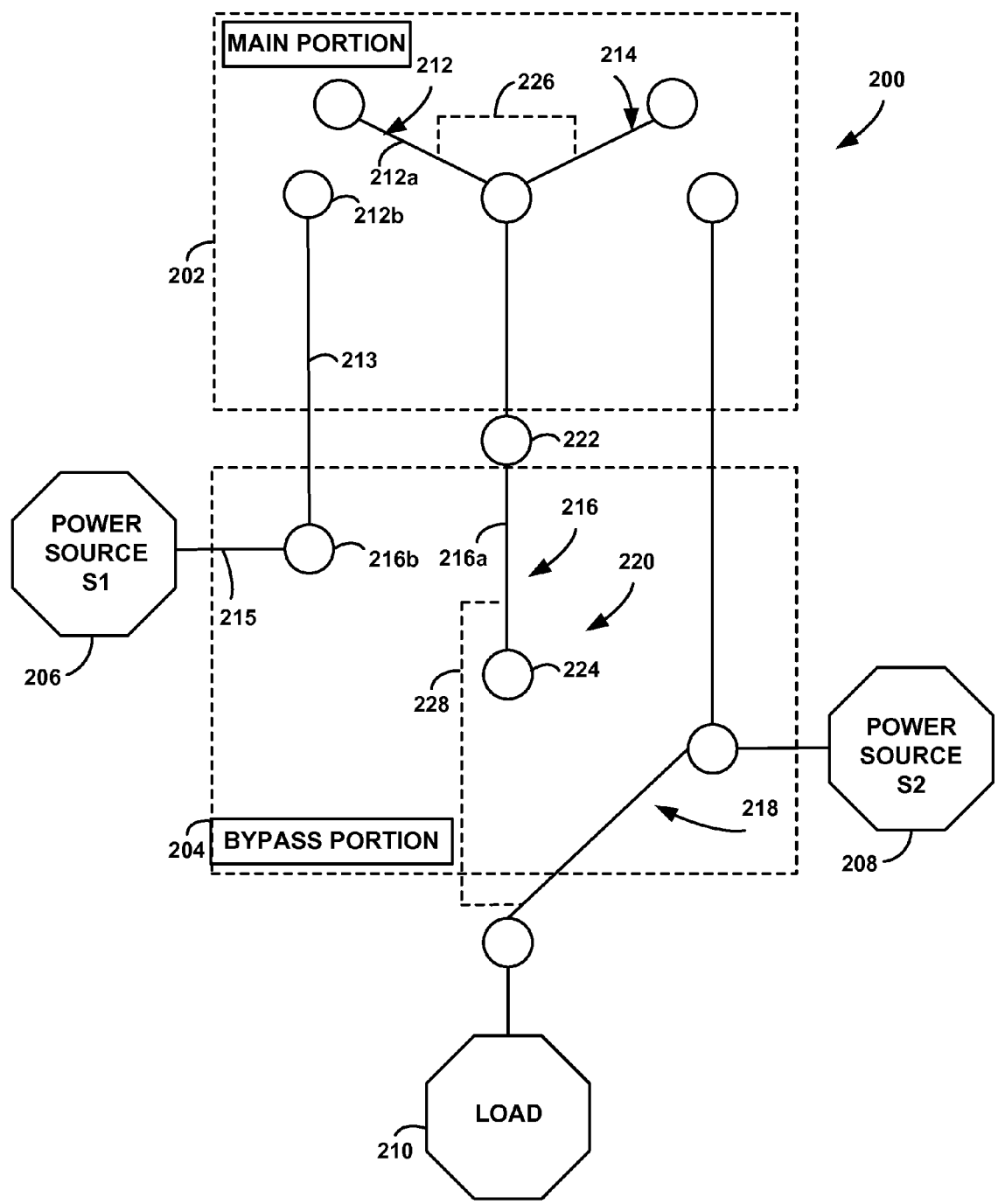
FIG. 6 is a schematic drawing of the example ATS of FIG. 2, where the second bypass switch is connected to the second power source.

The main transfer switch portion 202 may have three alternative conditions. In particular, a first condition is first main switch 212 closed and second main switch 214 open. For instance, FIG. 3 depicts ATS 200 having first main switch 212 closed and second main switch 214 open. In this first condition, the first main switch 212 is connected to the first power source 206. A second condition is first main switch 212 open and second main switch 214 closed. FIG. 4 depicts ATS 200 having first main switch 212 open and second main switch 214 closed. In this second condition, the second main switch 214 is connected to the second power source 208. A third condition is a neutral condition with first main switch 212 open and second main switch 214 open (e.g., as shown in FIGS. 5 and 6). In this neutral position, power may be supplied to the load via the bypass transfer switch portion 204. It is a major advantage of Applicants' disclosed bypass topology that the load may be supplied via the bypass portion 203 while the main portion is in any position (i.e., closed to S1, closed to S2, or open). This may be appropriate in other parts of this disclosure as well.

The bypass transfer switch portion 204 may have three alternative conditions. In particular, a first condition is where first bypass switch 216 is closed to switch 216b and second bypass switch 218 is closed to the load 210. FIG. 5 depicts ATS 200 having first bypass switch 216 closed to switch 216b and second bypass switch 218 closed to the load 210. In this first condition, the first bypass switch 216 is connected to first power source 206. A second condition is first bypass switch 216 closed to switch 222 and second bypass switch 218 closed to the load 210. FIG. 6 depicts ATS 200 having first bypass switch 216 closed to switch 222 and second bypass switch 218 closed to load 210. In this second condition, the second bypass switch 218 is connected to second power source 208. A third condition is a neutral condition with first bypass switch 216 closed to switch 222 and second bypass switch 218 closed to the load 210 (e.g., as shown in FIG. 3-4). In this neutral position, power may be supplied to the load via the main transfer switch portion 202. As seen in FIGS. 2-4, bypass switches 216, 218 act to form the primary load connection 220.

In an example embodiment, main transfer switch portion 202 may include an interlock mechanism between the first main switch and the second main switch. For example, as shown in FIG. 2, main transfer switch portion 202 may include interlock mechanism 226. This interlock mechanism 226 may prevent the first main switch 212 and the second main switch 214 from closing at the same time. The interlock can comprise a link connecting the two switches, or the two switches 212 and 214 may actually be comprised of one double throw switch that either has or does not have an open position. This interlock mechanism may be any suitable interlock mechanism now known in the art or later developed. For instance, interlock mechanism 226 may be a mechanical interlock and/or an electrical interlock. Another major advantage of Applicants' disclosed bypass topology is that the interlock 226 is simply not required under any sequence of operation. The need for such an interlock is simply eliminated.

In another example embodiment, bypass transfer switch portion 204 may include an interlock mechanism between the first bypass switch and the second bypass switch. For example, bypass transfer switch portion 204 may include interlock mechanism 228. The interlock mechanism 228 may prevent the first bypass switch 216 and the second bypass switch 218 from closing at the same time. This interlock mechanism may be any suitable interlock mechanism now known in the art or later developed. For instance, interlock mechanism 228 may be a mechanical interlock and/or an electrical interlock.

This proposed ATS 200 can be described as two transfer switches arranged in a dual series arrangement, with two load isolation contact points between the two transfer switches. This disclosed transfer-switch topology does not require an interlock mechanism between the main transfer switch portion 202 and the bypass transfer switch portion 204. This is due to the fact that activation of either bypass switch 216 or 218 (i.e., closing of either bypass switch 216 or 218) will sever the load connection 220 of the main transfer switch portion 202. For instance, as can clearly be seen in FIG. 5, activation of bypass switch 216 to the closed position severs the primary load connection 220. Similarly, as can clearly be seen in FIG. 6, activation of bypass switch 218 to the closed position severs the primary load connection 220.

Therefore, as can be seen in FIGS. 5 and 6, the main switch portion 202 resides in a neutral position and is isolated from the load 210. Consequently, this topology does not require a distinct isolation step that may be required with certain conventional ATSs. This disclosed topology for ATS 200 cannot produce a short-circuit via any combination of the main switch positions and the bypass switch positions. For instance, even if main switch 212 and bypass switch 218 are closed at the same time, the load 210 will only be connected to second power source 208. Similarly, even if main switch 214 and bypass switch 216 are closed at the same time, the load 210 will only be connected to first power source 206. Thus, once the bypass switch is activated, the main transfer switch portion can be exercised without switching the load(s) between the two power sources.

As described above, the topology depicted in FIG. 2 beneficially isolates the main transfer switch portion 202 from the load 210 upon activation of the bypass switch; however, the topology shown in FIG. 2 does not provide complete electrical isolation from the power source connections 206, 208. Complete isolation from the power sources may be desired for various reasons such as, for example, maintenance purposes. Therefore, an ATS in accordance with the present disclosure may be configured such that the main transfer switch portion is electrically isolated from the load, first power source, and second power source when the bypass switch portion is activated to form a bypass connection from one of the first power source or the second power source to the load.

Figure 7:
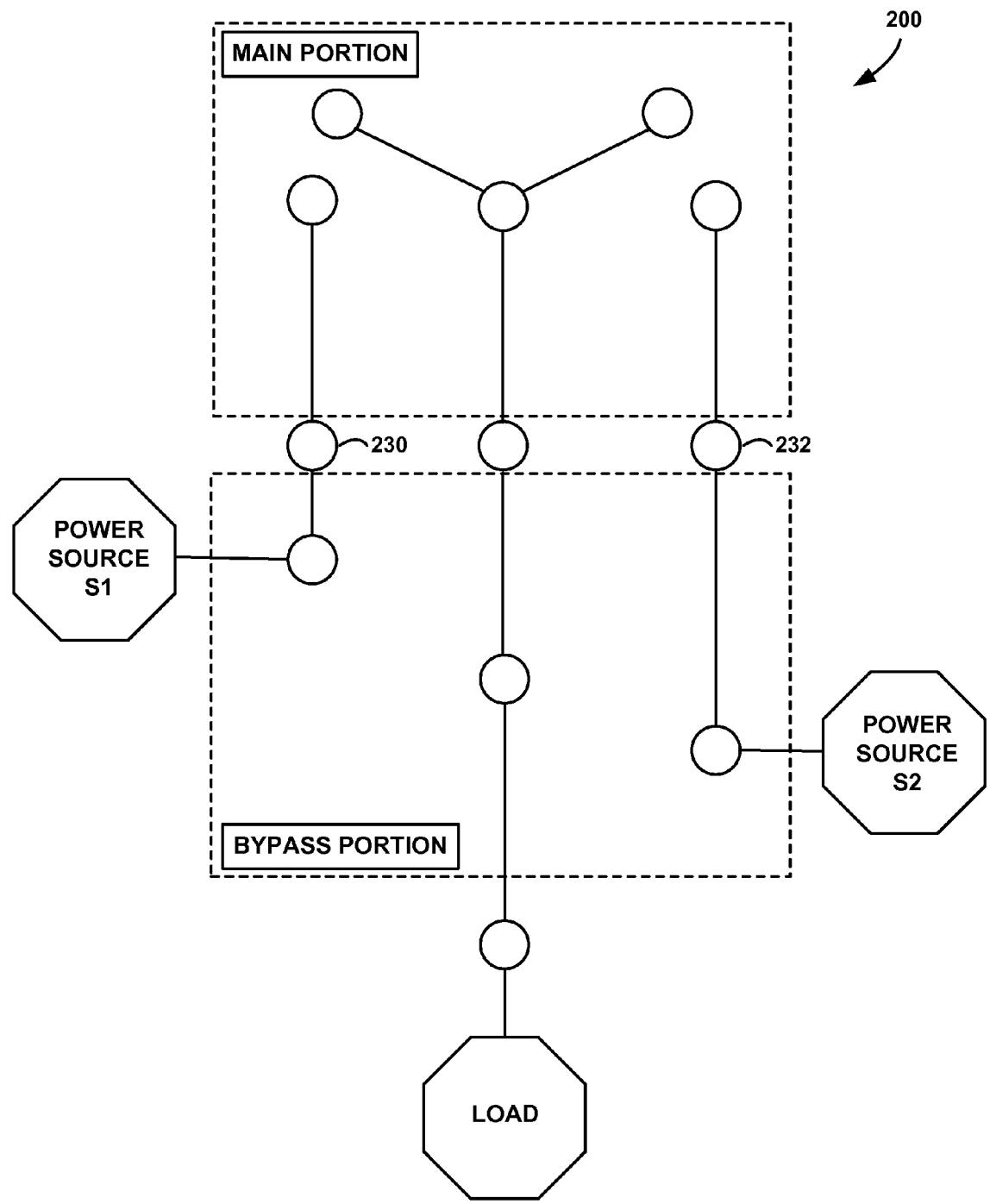
FIG. 7 is a schematic drawing of the example ATS of FIG. 2, according to an example embodiment of the present disclosure.

In particular, complete electrical isolation from the power source connections 206, 208 may be achieved in ATS 200 with the addition of two source-isolation contacts. Example placement of such additional source-isolation contacts is shown in FIG. 7. As shown, ATS 200 may include a first source-isolation contact 230 between the main transfer switch portion 202 and the first power source 206. Further, ATS 200 may also include a second isolation-contact 232 between the main transfer switch portion 202 and the second power source 208.

These source-isolation contacts 230, 232 may be any suitable source-isolation contact. For example, these source-isolation contacts 230, 232 may include self aligning jaws that interconnect with bus stabs. In an example embodiment, the first source-isolation contact 230 and the second source-isolation contact 232 are interlocked such that the first source-isolation contact 230 and the second source-isolation contact 232 are configured to open and close at the same time.

ATS 200 shown in FIG. 7 results in a fully functional replacement to the original topology of ATS 100 shown in FIG. 1. This topology of ATS 200 provides example advantages over the topology depicted in FIG. 1. For instance, the ATS 200 provides reduced complexity of design and increased simplicity of operation. This may result in lower manufacturing costs, as well as faster and simpler maintenance of the ATS.

As discussed above, the disclosed ATS beneficially provides a method for electrically isolating the main transfer switch portion from the bypass transfer switch portion without physically separating the main transfer switch portion from the bypass transfer switch portion. In an example embodiment of the disclosed method, an ATS such as the ATS 200 may be provided. For example, the ATS may include (i) a main transfer switch portion configured to connect one of a first power source or a second power source to the load (ii) a bypass transfer switch portion configured to form a bypass connection from one of the first power source or the second power source to the load, and (iii) a primary load connection connecting the main transfer switch portion to the load via the bypass transfer switch portion. An example method may involve the bypass transfer switch portion activating to form the bypass connection from one of the first power source or the second power source to the load, wherein activating to form the bypass connection severs the primary load connection connecting the main transfer switch portion to the load via the bypass transfer switch portion, wherein severing the primary load connection isolates the main transfer switch portion from the load. In an example, the bypass switch may also electrically isolate the first power source and the second power source from the main transfer switch portion via respective source-isolation contacts.

The ATS described above with respect to FIGS. 2-7 is depicted as a single phase ATS with which a single pole main switch and single pole bypass switch are employed. However, it should be understood that the disclosed ATS may be configured to have more poles, such as in a two-phase ATS, three phase ATS, and so forth. In addition, although the transfer switch described above is referred to as an automatic transfer switch, the disclosed method and system may apply to any suitable transfer switch, such as a manual transfer switch.

3. EXAMPLE BENEFITS OF THE DISCLOSED SYSTEMS AND METHODS

As described above, the proposed methods and systems beneficially provide an improved ATS and method for isolating a main transfer switch portion from a bypass transfer switch portion. The disclosed methods and systems provide a simpler topology for a bypass transfer switch that results in advantages over existing ATS topologies. The disclosed ATS provides a simple and safe means for activating and deactivating the bypass mechanism in the ATS. By using the disclosed ATS, users of the ATS (e.g., maintenance workers) who may be facing heightened stress and duress during a power outage or a transfer switch malfunction, may require fewer operational steps to conduct typical maintenance tasks associated with bypass transfer switches. For instance, the disclosed ATS removes the need for the user to physically separate the main transfer switch portion from the bypass transfer switch portion in order to electrically isolate the two switches. Further, the disclosed mechanical design removes the need for an interlock mechanism between the two switching devices. For these reasons and the reasons described throughout the disclosure, the disclosed methods and systems can help improve the operation and maintenance of a transfer switch having a bypass mechanism.

4. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. An automatic transfer switch (ATS) configured for supplying power to an electrical load, the ATS comprising:
    a main transfer switch portion configured to connect either a first power source or a second power source to the load, the main transfer switch portion comprising (i) a first main switch configured to connect the first power source to the load upon closing of the first main switch and (ii) a second main switch configured to connect the second power source to the load upon closing of the second main switch;
    a bypass transfer switch portion configured to form a bypass connection from either the first power source or the second power source to the load, the bypass transfer switch portion comprising (i) a first bypass switch configured to connect the first power source to the load upon closing of the first bypass switch and (ii) a second bypass switch configured to connect the second power source to the load upon closing of the second bypass switch; and
    a primary load connection connecting the main transfer switch portion to the load, wherein the primary load connection is formed at least in part by the first bypass switch and the second bypass switch, and wherein closing of either the first bypass switch or the second bypass switch severs the primary load connection between the main transfer switch portion and the load.

2. The ATS of claim 1, wherein the primary load connection further comprises a first load-isolation contact and a second load-isolation contact, wherein the first bypass switch is connected to the first load-isolation contact when in an open state, and wherein the second bypass switch is connected to the second load-isolation contact when in an open state.

3. The ATS of claim 1, further comprising:
    a first source-isolation contact between the main transfer switch portion and the first power source; and
    a second isolation-contact between the main transfer switch portion and the second power source.

4. The ATS of claim 1, further comprising an interlock mechanism between the first main switch and the second main switch, wherein the interlock mechanism prevents the first main switch and the second main switch from closing at the same time.

5. The ATS of claim 1, further comprising an interlock mechanism between the first bypass switch and the second bypass switch, wherein the interlock mechanism prevents the first bypass switch and the second bypass switch from closing at the same time.

6. The ATS of claim 1, wherein the bypass connection circumvents the main transfer switch portion upon activation of the bypass transfer switch portion.

7. The ATS of claim 1 wherein the first main switch and the second main switch comprise a double throw switch.

8. The ATS of claim 7 wherein the double throw switch comprises an open position.

9. An automatic transfer switch (ATS) configured for supplying power to an electrical load, the ATS comprising:
  a main transfer switch portion configured to connect either a first power source or a second power source to the load, the main transfer switch portion comprising (i) a first main switch configured to connect the first power source to the load upon closing of the first main switch and (ii) a second main switch configured to connect the second power source to the load upon closing of the second main switch;
  a bypass transfer switch portion configured to form a bypass connection from either the first power source or the second power source to the load, the bypass transfer switch portion comprising (i) a first bypass switch configured to connect the first power source to the load upon closing of the first bypass switch and (ii) a second bypass switch configured to connect the second power source to the load upon closing of the second bypass switch; and
  a primary load connection connecting the main transfer switch portion to the load, wherein the primary load connection is formed at least in part by the first bypass switch and the second bypass switch, and wherein closing of either the first bypass switch or the second bypass switch severs the primary load connection between the main transfer switch portion and the load;
  wherein the ATS is configured such that the main transfer switch portion is electrically isolated from the load, first power source, and second power source when the bypass switch portion is activated to form a bypass connection from either the first power source or the second power source to the load.

10. The ATS of claim 9, further comprising:
  a first source-isolation contact between the main transfer switch portion and the first power source; and
  a second isolation-contact between the main transfer switch portion and the second power source.

11. The ATS of claim 10, wherein the first source-isolation contact and the second source-isolation contact each comprise self aligning jaws.

12. The ATS of claim 11, wherein the first source-isolation contact and the second source-isolation contact are interlocked such that the first source-isolation contact and the second source-isolation contact are configured to open and close at the same time.

13. The ATS of claim 9, wherein the primary load connection further comprises a first load-isolation contact and a second load-isolation contact, wherein the first bypass switch is connected to the first load-isolation contact when in an open state, and wherein the second bypass switch is connected to the second load-isolation contact when in an open state.

14. The ATS of claim 9, further comprising an interlock mechanism between the first main switch and the second main switch, wherein the interlock mechanism prevents the first main switch and the second main switch from closing at the same time.

15. The ATS of claim 9, further comprising an interlock mechanism between the first bypass switch and the second bypass switch, wherein the interlock mechanism prevents the first bypass switch and the second bypass switch from closing at the same time.

16. The ATS of claim 9, wherein the bypass connection circumvents the main transfer switch portion upon activation of the bypass transfer switch portion.

17. In an automatic transfer switch (ATS) comprising (i) a main transfer switch portion configured to connect either a first power source or a second power source to a load (ii) a bypass transfer switch portion configured to form a bypass connection from either the first power source or the second power source to the load, and (iii) a primary load connection connecting the main transfer switch portion to the load via the bypass transfer switch portion, a method for electrically isolating the main transfer switch portion from the bypass transfer switch portion without physically separating the main transfer switch portion from the bypass transfer switch portion, the method comprising:
  the bypass transfer switch portion activating to form the bypass connection from either the first power source or the second power source to the load, wherein activating to form the bypass connection severs the primary load connection connecting the main transfer switch portion to the load via the bypass transfer switch portion, wherein severing the primary load connection isolates the main transfer switch portion from the load.

18. The method of claim 17, further comprising the bypass transfer switch portion electrically isolating the first power source and the second power source from the main transfer switch portion via respective source-isolation contacts.

19. The ATS of claim 17 wherein the first main switch and the second main switch comprise a double throw switch.

20. The ATS of claim 19 wherein the double throw switch comprises an open position.

* * * * *